(12) United States Patent
Schmitz et al.

(10) Patent No.: US 11,661,240 B2
(45) Date of Patent: May 30, 2023

(54) LIQUID SUPPLY SYSTEM

(71) Applicant: GRUNDFOS HOLDING A/S, Bjerringbro (DK)

(72) Inventors: Rainer Schmitz, Mönchengladbach (DE); Valeri Kechler, Pforzheim (DE); Klaus Müller, Karlsruhe (DE)

(73) Assignee: GRUNDFOS HOLDING A/S, Bjerringbro (DK)

( * ) Notice: Subject to any disclaimer, the term of this patent is extended or adjusted under 35 U.S.C. 154(b) by 35 days.

(21) Appl. No.: 17/357,218

(22) Filed: Jun. 24, 2021

(65) Prior Publication Data
US 2021/0403201 A1 Dec. 30, 2021

(30) Foreign Application Priority Data
Jun. 30, 2020 (EP) .................................. 20183132

(51) Int. Cl.
*B65D 25/48* (2006.01)
*G01F 23/00* (2022.01)

(52) U.S. Cl.
CPC ......... *B65D 25/48* (2013.01); *G01F 23/0007* (2013.01); *B65D 2203/04* (2013.01)

(58) Field of Classification Search
CPC ........ F04B 13/00; F04B 23/02; F04B 23/025; F04B 23/026; F04B 23/028; F04B 49/02; F04B 49/025; F04B 49/04; F04B 2205/00; B67D 7/58; B67D 7/62; B67D 7/64; B67D 7/645; B67D 7/66; B67D 7/68; B67D 7/70; B65D 25/48; B65D 2203/04; G01F 23/0007
USPC ........................................................... 222/23
See application file for complete search history.

(56) References Cited

U.S. PATENT DOCUMENTS

| | | | | | |
|---|---|---|---|---|---|
| 3,601,285 | A | * | 8/1971 | Leger ........................ | B67D 7/62 222/66 |
| 2015/0177742 | A1 | * | 6/2015 | Ivarsson ................ | F04B 23/021 417/53 |
| 2019/0085840 | A1 | * | 3/2019 | Leonard .................. | F04B 49/20 |
| 2019/0101427 | A1 | | 4/2019 | Beger et al. | |
| 2021/0403201 | A1 | * | 12/2021 | Schmitz .............. | G01F 23/0007 |

FOREIGN PATENT DOCUMENTS

EP 3933193 A1 * 1/2022 ............. B65D 25/48

* cited by examiner

*Primary Examiner* — Paul R Durand
*Assistant Examiner* — Michael J. Melaragno
(74) *Attorney, Agent, or Firm* — McGlew and Tuttle, P.C.

(57) ABSTRACT

A liquid supply system includes a suction lance (6) configured to be inserted into a liquid container (14) and at least one level sensor (10, 12) fixed on the lance (6) and configured to detect a liquid level (22) inside a liquid container (14). A control device (4) is connected to the level sensor (10, 12) and configured to determine a rate of change of the liquid level (22) detected by the at least one level sensor (10, 12) and to detect a lance removal if the rate of change reaches or exceeds a predefined threshold. A method for detecting the removal of a suction lance (6) from a liquid container (14) is provided.

20 Claims, 1 Drawing Sheet

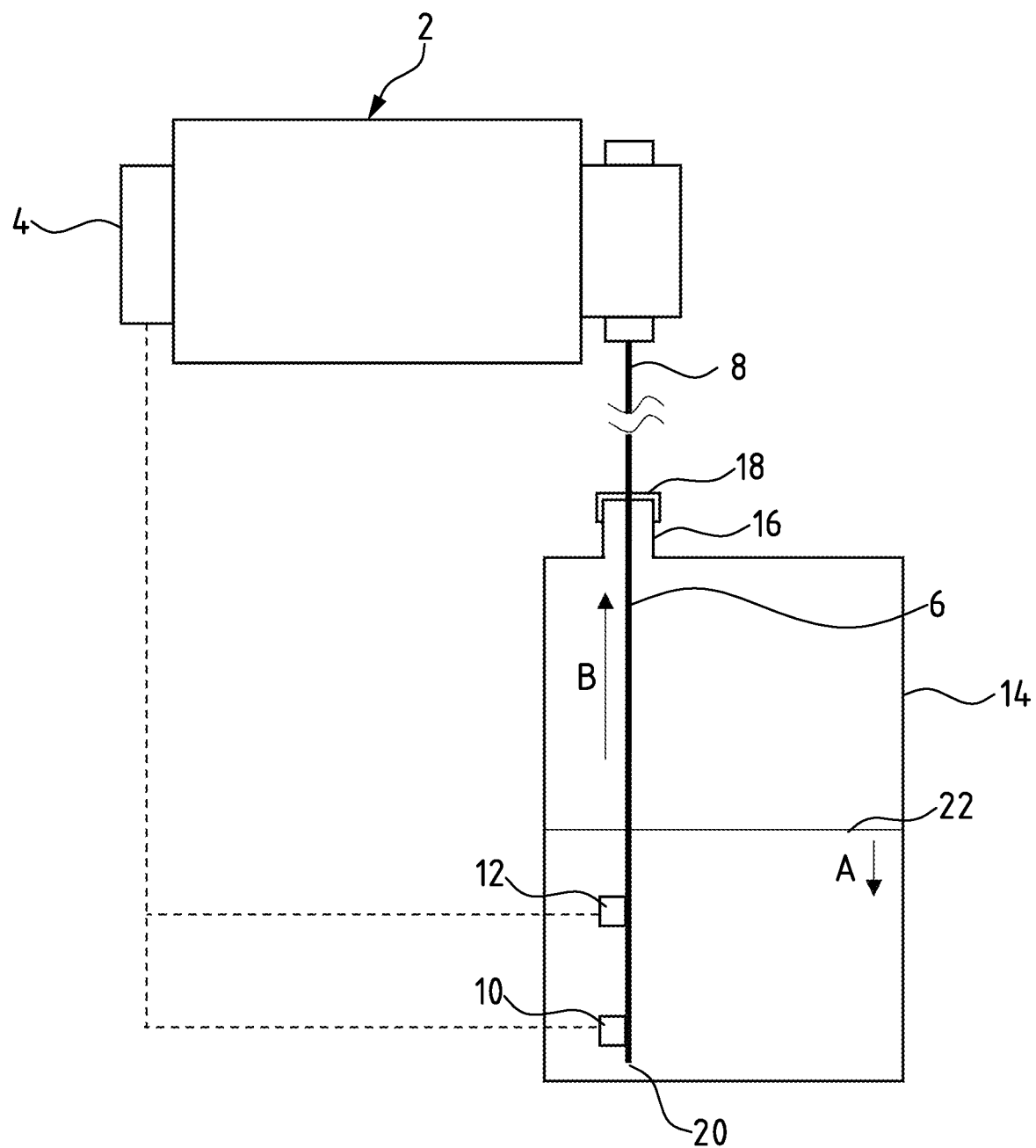

LIQUID SUPPLY SYSTEM

CROSS REFERENCE TO RELATED APPLICATIONS

This application claims the benefit of priority under 35 U.S.C. § 119 of European Application 20183132.8, filed Jun. 30, 2020, the entire contents of which are incorporated herein by reference.

TECHNICAL FIELD

The invention refers to a liquid supply system and to a method allowing to detect the removal of a suction lance from a liquid container.

TECHNICAL BACKGROUND

It is often required to supply liquids like chemicals to an industrial process or a facility. Often the liquids or chemicals are provided or delivered in liquid containers, in particular exchangeable or disposable liquid containers. It is known to insert a suction lance into an opening of the container allowing to suck the liquid out of the container, for example by use of a pump, in particular a metering pump.

For several reasons it may be desired to detect if the suction lance is removed from the container, for example to stop a metering pump or a process into which the respective liquid or chemical is supplied to avoid malfunctions if the respective liquid is not supplied to the process. Furthermore, it may be intended to avoid a removal of the suction lance to prevent a refilling of the container, since by refilling there is the risk that a wrong liquid or a liquid of different quality is filled into the container. Therefore, in some applications it is desired to use original containers only which are originally sealed.

SUMMARY

In view of this it is an object of the invention to provide a liquid supply system and a method allowing to detect a removal of a suction lance from a liquid container in a simple manner.

This object is achieved by a liquid supply system having the features according to the system of the invention defined and by a method having the features according to the method of the invention. Preferred embodiments are disclosed in the following description and the accompanying drawings.

The liquid supply system according to the invention comprises a suction lance which is provided and configured to be inserted into a liquid container. The liquid container may have an opening having a size adapted for insertion of the suction lance. Thereby, preferably the opening has a size just as great as necessary for inserting the suction lance. The suction lance may comprise a closing element completely closing the opening if the suction lance is inserted into the container to avoid a contamination of the liquid inside the container. On said lance there is fixed at least one level sensor (a level sensor device comprising at least one level sensor) for detecting a liquid level inside a liquid container. This in particular may be a level sensor used to detect a minimum level inside the container or the complete emptying of the container. This level sensor is fixedly attached to the suction lance so that this is inserted into the liquid container together with the suction lance. The length of the suction lance is adapted to the height of the container, so that the free end having a suction opening of the suction lance is positioned close to the bottom of the container. The suction lance may have a connection or fixing means provided to connect the suction lance in a defined position, in particular in a defined vertical position inside the liquid container. By this also the level sensor is positioned inside the liquid container. Preferably the level sensor is arranged in a predefined height. The connecting means may be formed by a thread surrounding the opening of the container. The suction lance may have a closing element with a corresponding thread so that the closing element can be screwed onto the thread surrounding the opening, closing the opening and thereby fixing the suction lance inside the liquid container.

Said at least one level sensor is connected to a control device so that the control device receives an output signal from the level sensor representing a liquid level, i.e. the vertical position of the liquid level, inside the container. The control device comprises one or more processors and memory. The control device is designed and configured to determine a rate of change of the liquid level which is detected by said at least one level sensor (the level sensor device comprising one or more level sensors). This means a control device detects the speed of change of the liquid level, i.e. of the vertical height of the liquid level, as detected by the level sensor. Furthermore, the control device is configured such that the control device can detect a lance removable on basis of the determined change rate of the liquid level. In particular the control device is configured such that it detects a lance removal if the rate of change reaches or exceeds a predefined threshold. The threshold is set to a value which during normal operation is not reached. This means during normal operation the liquid level inside the container decreases with a maximum speed depending on the flow rate through the suction lance. Thereby, the level sensor detects the movement of the liquid level relative to the position of the liquid sensor or another predefined vertical position on the suction lance. If the suction lance is removed in vertical direction from the container which is still filled with liquid, the level sensor is moved together with the lance relative to the liquid level. Thus, also by movement of the suction lance the level sensor will detect a change of the liquid level, i.e. a decreasing of the liquid level relative to the level sensor. However, this movement is not a result of liquid flowing out of the container but of the movement of the suction lance out of the container in vertical direction. Normally this movement is much faster than the decrease of the liquid level in result of liquid being sucked out of the liquid container. Therefore, by the different speed of change of the liquid level it is possible to distinguish between normal operation and a removal of the suction lance.

Thus, the liquid supply system according to the invention easily allows a detection of the removal of the suction lance without the need of additional sensors. Preferably, a level sensor which is usually provided on the suction lance for detecting the liquid level inside the container can additionally be used for detecting a lance removal. It is just necessary to provide a respective control routine inside the control device.

According to a preferred embodiment said control device is configured such that it produces a lance removal signal when detecting the lance removal in the afore described manner. The lance removal signal may be an alarm signal output to a user or operator or a signal transferred to a further control or used in the control device itself to start a further action, for example to stop the operation of a pump sucking liquid out of the liquid container.

According to a further possible embodiment there are provided at least two level sensors (the level sensor device comprises at least two level sensors) which are fixed on the suction lance such that the at least two level sensors are vertically distanced from each other (with the lance extending vertically). Furthermore, the control device may be configured to measure a time between falling dry of the two sensors as a rate of change. These two level sensors may be an empty-sensor placed in a vertical height at which the complete emptying of the container is signaled and a pre-empty-sensor arranged in a vertical higher position to produce a pre-empty signal at a certain time before the container is completely emptied. Such an arrangement is known in the art. The pre-empty signal may be used to signalize an operator or user that a new liquid container should be ordered or should be provided, since the container in use will be emptied in the near future. It would also be possible to provide more than two level sensors fixed on said suction lance at different vertical heights to detect different heights of the liquid level inside a container. The known arrangement of at least two level sensors distanced from on other in vertical direction can additionally be used to detect a lance removal. A lance removal may be detected if the time between falling dry of the at least two sensors is below a certain threshold. The threshold is set such that the period in time defining the threshold is not reached during normal operation. For example it may be that during normal operation the decrease of the liquid level has a speed such that the time between falling dry of the two level sensors is several minutes. However, when removing the suction lance out of the liquid the time may for example be below ten seconds. In case that more than two level sensors are provided on the lance for lance removal detection the time between the falling dry of two sensors may be considered. However, also the time intervals between the sensor signals of several sensors may be regarded in similar manner.

In an alternative embodiment the at least one level sensor (the level sensor device comprising at least one sensor) may be a single sensor configured to detect different liquid levels. In particular the liquid sensor may be provided to continuously detect the liquid level and the change of the liquid level. For example the level sensor may be an ultrasonic sensor sending an ultrasonic signal onto the surface of the liquid inside the container and measuring the signal propagation time depending on the distance between the ultrasonic sensor and the liquid surface. For example by such a sensor a continuous level measurement is possible.

In case that at least two level sensor are provided, these level sensors preferably are configured as liquid sensors detecting a dry state and a wet state. This means these level sensors can just distinguish between wet and dry. Thus, a sensor like this can detect if the liquid level falls below the respective sensor, since than the sensor falls dry. For example, capacitive sensors or sensors measuring the conductivity of the surrounding medium can be used.

According to a further possible embodiment the at least one level sensor (the level sensor device comprising at least one sensor) may be a floating sensor or float switch. A floating sensor is configured to continuously detect the liquid level for example if a floating element is connected to a position sensor detecting the vertical position of the floating element floating on the liquid surface. Alternatively, a float switch may be provided to just detect that the liquid level reaches a certain height or falls below a certain height, respectively. For example a floating element may contain a magnet which at a certain level reaches the vertical position of a reed contact detecting that the predefined height is reached by the floating element.

According to a further preferred embodiment of the invention the liquid supply system comprises at least one metering pump which is connected to said suction lance. Furthermore, said control device may be connected to or be integrated into a pump control. In particular the described control device for detecting the lance removal can be realized as a software application inside the pump control. The pump control for example may control the drive of a metering pump to adjust a metering or dosing rate. However, in an alternative embodiment of the invention the liquid supply system may contain different means for feeding the liquid, for example any kind of pump and, preferably, the control device for detecting the lance removal is integrated into a control of such feeding means or into a control device used in the liquid supply system, anyway. As described before, the lance removal detection system preferably is realized as a software application running on a controller used for other purposes in addition.

According to a further embodiment of the invention the described pump control may be configured such that the pump control generates a lance removal signal and/or inhibits a restart of the pump, in particular the metering pump, if the lance removal is detected. For example the alarm signal may be shown on a display of the pump control. It may be advantageous to directly stop the operation of the pump to avoid dry running of the pump or sucking of air. Further preferably, the lance removal signal may be output to other control systems, for example control systems of a facility or application to stop the application in case that the lance is removed from the liquid supply to prevent negative effects in a process requiring the supplied liquid or chemical.

The pump control, furthermore, may be configured such that for restart of the pump or metering pump after detection of a lance removal the pump control requires a restart code. This restart code may be input by an operator or may for example be read or received from a container into which the suction lance is inserted. By this the correct setup can be ensured since it can for example be ensured that the restart can be initiated by authorized persons only.

Beside the liquid supply system described before the invention refers to a method for detecting the removal of a suction lance from a liquid container inside a liquid supply system, in particular a liquid supply system as described before. Preferred features of the liquid supply system described above can be regarded as preferred features of the method described in the following, too.

The method according to the invention is carried out in connection with the suction lance comprising at least one level sensor (a level sensor device comprising at least one sensor) which is fixed on said suction lance, in particular fixed in a defined vertical position. The liquid level sensor may be configured for example as described above. In the method according to the invention a rate of change of the liquid level is detected by said at least one level sensor and a lance removal is detected if the rate of change reaches or exceeds a predefined threshold. This means it is possible to detect a lance removal if the change of the height of the liquid level is faster than during normal operation, i.e. if the liquid level relative to the level sensor decreases faster than possible by feeding or pumping liquid out of the liquid container. Thus, the threshold is defined such that it cannot be reached during normal operation. For example during normal operation the change of the liquid level by a predefined height may take several minutes whereas when removing the suction lance the relative movement of the respective level sensor relative to the liquid level occurs within several seconds.

Preferably at least two level sensors are fixed on said suction lance such that they are vertically distanced from each other when the suction lance is in use. On basis of such an arrangement a rate of change may be determined on basis of the time detected between falling dry of the two sensors. When the liquid level decreases first the upper sensor falls dry and then after a certain period of time the lower sensor falls dry. The same occurs if the suction lance carrying the level sensors in moved out of the liquid in vertical direction, which is the case if the suction lance is pulled out of an opening on top of the container. However, when removing the suction lance the period of time between the detection of a dry status at both level sensors is much smaller than during normal operation. This allows to detect the lance removal by use of the level sensors attached to the suction lance. The lance removal, therefore, is detected if the time between falling dry of the at least two level sensors is below a predefined threshold.

In the following the invention is described by way of example with reference to the accompanying drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view showing a liquid supply system according to the invention.

DESCRIPTION OF PREFERRED EMBODIMENTS

Referring to the drawings, the shown liquid supply system comprises a metering pump 2 having a control device 4 for controlling the operation of the metering pump 2. The metering pump 2 is connected to a suction lance 6 via a suction line 8. On the suction lance 6 there are fixed two level sensors 10 and 12 (a level sensor device comprising at least one level sensor). The level sensors 10 and 12 are vertically distanced and the level sensor 10 is provided for generating an empty signal, whereas the higher level sensor 12 is arranged for generating a pre-empty signal. The level sensors 10 and 12 are connected to the control device 4 so that the control device 4 can receive and evaluate the sensor signals.

The suction lance 6 is inserted into a liquid container 14 for supplying a liquid like a chemical which is pumped or sucked by the metering pump 2. The liquid container 14 has an opening 16 through which the suction lance 6 is inserted. On the suction lance 16 there is arranged a closing element 18 which is attached to the opening 16 for closing the remaining part of the opening and fixing the suction lance 6 inside the liquid container 14, in particular in vertical direction. The lower free end 20 of the suction lance 16 in this position is arranged close to the bottom of the liquid container 14. In this free end 20 the suction lance 6 has a suction opening through which a liquid is sucked and feed to the metering pump 2. During operation of the metering pump 2 liquid is sucked out of the liquid container 14 so that the liquid level 22 decreases in the direction of the arrow A. When the liquid level 22 reaches the upper liquid sensor 12 the liquid sensor 12 gives a signal to the control device 4 which is the pre-empty signal. The control device 4 may signalize to an operator that the liquid container 14 becomes emptied soon. With the further decreasing of the liquid level 22 in direction A the liquid level 22, then, will reach the lower level sensor 10 when the liquid container 14 is emptied or substantially emptied and the signal generated by the level sensor 10 in response can be regarded as an empty signal. This signal is transferred to the control device 4 and the control device 4 can for example stop the operation of the metering pump 2 and signalize to an operator that the liquid container 14 has to be exchanged.

According to the invention the control device 4 is configured such that the control device 4 has a lance removal detection system. This may be realized by a respective software inside the control device 4. During normal operation the decreasing of the liquid level 22 takes a certain time, i.e. there is a certain time between the upper level sensor 22 falling dry and the lower level sensor 10 falling dry. If the suction lance 6 is removed out of the liquid container 14 in direction of arrow B the upper level sensor 12 will pass the liquid level 22 first and the lower level sensor 10 will pass the liquid level 22 later. This means also when removing the suction lance 6 the upper level sensor 12 falls dry first and the lower level sensor 10 falls dry later. However, the speed when removing the suction lance 6 out of the liquid container 14 is much faster than the speed with which the liquid level 22 decreases during normal operation. This means dB/dt is higher than dA/dt. This allows to detect the lance removal if the change rate of the liquid level 22 detected by the level sensors 10 and 12 is higher than a predefined threshold, i.e. if the time period between the signals generated by the upper level sensor 12 and the lower level sensor 10 showing that the sensors fall dry is smaller than a predefined threshold. For example the threshold may be ten seconds. Thus, if the time between a dry detection of the upper level sensor 12 and the lower level sensor 10 is below 10 seconds this is regarded as a removal of the lance 6 out of the liquid container 14.

The control device 4 may be configured such that in response of the lance removal detection the control device 4 starts an action for example stops the operation of the metering pump 2 or signals to an operator that the suction lance 6 has been removed from the liquid container 14. With this, for example, a change of the liquid container 14 can be detected. Furthermore, it can be detected if the suction lance 6 is removed from the liquid container 14 to open the opening 16, for example for refilling the liquid container 14. In certain applications if may be undesirable to refill the liquid container 14, for example to ensure a certain quality of the liquid supplied to the metering pump 2. For these solutions the described lance removal detection may be advantageous.

In case that the lance is removed after the liquid container has been emptied no lance removal can be detected by use of the two level sensors 10 and 12. Thus, the lance can be removed from the liquid container 14 without an alarm or any further action of the control device 4.

In this embodiment there are shown two level sensors 10 and 12 vertically distanced from one another. However, it would also be possible for the level sensor device to comprise a floating sensor which may be able to detect different liquid levels 22 and detect a change of the height of the liquid level 22 with a single sensor. For example a floating element may be coupled to a position sensor detecting the vertical position. Also by use of such a single level sensor it would be possible to detect the change rate of the height of the liquid level 22 to analyze whether the change is faster than a predefined threshold which cannot be achieved during normal operation of the metering pump 2 and thus indicates a lance removal.

While specific embodiments of the invention have been shown and described in detail to illustrate the application of the principles of the invention, it will be understood that the invention may be embodied otherwise without departing from such principles.

LIST OF REFERENCE CHARACTERS

2 metering pump
4 control device
6 suction lance
8 suction line
10, 12 level sensors
14 liquid container
16 opening
18 closing element
20 free end
22 liquid level
A direction in which the liquid level decreases
B lance removal direction

What is claimed is:

1. A liquid supply system comprising:
 a suction lance configured to be inserted into a liquid container;
 at least one level sensor fixed on said suction lance and configured to detect a liquid level inside a liquid container;
 a control device connected to said level sensor and configured to determine a rate of change of the liquid level detected by said at least one level sensor and to detect a removal of the suction lance if a rate of change of the liquid level detected by said at least one level sensor reaches or exceeds a predefined threshold.

2. The liquid supply system according to claim 1, wherein said control device is configured such that said control device produces a lance removal signal when detecting the removal of the suction lance.

3. The liquid supply system according to claim 1, further comprising at least another level sensor, wherein:
 the at least two level sensors are fixed on said suction lance vertically distanced from each other; and
 the control device is configured to measure a time between a falling dry of the two sensors as the rate of change of the liquid level detected by said at least one level sensor.

4. The liquid supply system according to claim 3, wherein the control device is configured to detect the removal of the suction lance if the time between falling dry of the at least two level sensors is below a predefined threshold.

5. The liquid supply system according to claim 1 wherein the at least one level sensor is a single sensor configured to detect different liquid levels.

6. The liquid supply system according to claim 3, wherein the at least two level sensors are configured as liquid sensors detecting a dry state and a wet state.

7. The liquid supply system according to claim 1, wherein the at least one level sensor is a float switch.

8. The liquid supply system according to claim 1, further comprising a metering pump connected to said suction lance, wherein said control device is connected to or integrated into a pump control of the metering pump.

9. The liquid supply system according to claim 8, wherein said pump control is configured such that said pump control generates a lance removal signal if the removal of the suction lance is detected or inhibits a restart of the metering pump if the removal of the suction lance is detected or both generates a lance removal signal and inhibits a restart of the metering pump if the removal of the suction lance is detected.

10. The liquid supply system according to claim 9, wherein said pump control is configured such that for restart of the metering pump, after detection of the removal of the suction lance, the pump control requires a restart code.

11. A method for detecting the removal of a suction lance from a liquid container, wherein the suction lance comprises at least one level sensor fixed on said suction lance, the method comprising the steps of:
 determining a rate of change of the liquid level detected by said at least one level sensor; and
 detecting a removal of the suction lance if the rate of change of the liquid level detected reaches or exceeds a predefined threshold.

12. The method according to claim 11, wherein:
 the suction lance further comprises at least another level sensor;
 the at least two level sensors are fixed on the suction lance vertically distanced from one another; and
 the rate of change is determined based on a time between falling dry of the two sensors.

13. The method according to claim 11, wherein the at least one level sensor is a single sensor configured to detect different liquid levels.

14. The method according to claim 11, wherein the suction lance is part of a liquid supply system that comprises the control device connected to said level sensor.

15. The method according to claim 14, wherein said control device is configured such that said control device produces a lance removal signal when detecting the removal of the suction lance.

16. The method according to claim 14, wherein a metering pump is connected to the suction lance, wherein the control device is connected to or integrated into a pump control of the metering pump.

17. The method according to claim 14, wherein said control device is configured such that said control device generates a lance removal signal if the removal of the suction lance is detected or inhibits a restart of the metering pump if the removal of the suction lance is detected or both generates a lance removal signal and inhibits a restart of the metering pump if the removal of the suction lance is detected.

18. A liquid supply system comprising:
 a suction lance configured to be inserted into a liquid container;
 a level sensor device fixed on said suction lance and configured to detect a liquid level inside a liquid container;
 a control device connected to said level sensor device and configured to determine a rate of change of the liquid level detected by said level sensor device and to detect a removal of the suction lance if a rate of change of the liquid level detected by said level sensor device reaches or exceeds a predefined threshold.

19. The liquid supply system according to claim 18, wherein:
 the level sensor device comprises at least two level sensors fixed on said suction lance and distanced from each other; and the control device is configured to measure a time between a falling dry of the two sensors as a rate of change.

20. The liquid supply system according to claim 18, wherein the level sensor device is a single sensor configured to detect different liquid levels.

\* \* \* \* \*